(12) United States Patent
Huff

(10) Patent No.: US 8,082,907 B2
(45) Date of Patent: Dec. 27, 2011

(54) AIR/OIL SEPARATING PCV APPARATUS

(75) Inventor: Daniel Huff, Spruce, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 449 days.

(21) Appl. No.: 12/415,054

(22) Filed: Mar. 31, 2009

(65) Prior Publication Data

US 2010/0242931 A1   Sep. 30, 2010

(51) Int. Cl.
*F02M 25/06* (2006.01)
(52) U.S. Cl. ........................................................ 123/572
(58) Field of Classification Search .......... 123/572–574, 123/41.86; 55/418–410, 459.1
See application file for complete search history.

(56) References Cited

U.S. PATENT DOCUMENTS

| | | | |
|---|---|---|---|
| 6,279,556 B1 * | 8/2001 | Busen et al. | 123/572 |
| 7,842,115 B2 * | 11/2010 | Brand et al. | 55/459.1 |
| 2006/0075998 A1 * | 4/2006 | Shieh et al. | 123/573 |
| 2006/0112941 A1 * | 6/2006 | Hilpert et al. | 123/573 |
| 2008/0127953 A1 * | 6/2008 | Shieh et al. | 123/573 |
| 2009/0241919 A1 * | 10/2009 | Janssen et al. | 123/572 |

* cited by examiner

*Primary Examiner* — Marguerite McMahon
(74) *Attorney, Agent, or Firm* — James Hasselbeck

(57) ABSTRACT

An improved air/oil separating PCV apparatus is disclosed that provides for integration of an air duct, cross-over duct, one way drain valve, PCV valve, cyclonic oil mist separator assembly, cyclone bypass valve, oil reservoir and oil fill cap into a single injection molded apparatus. The improved air/oil separating PCV apparatus is configured to permit it to be tooled in a vertical direction for injection molding.

10 Claims, 3 Drawing Sheets

AIR/OIL SEPARATING PCV APPARATUS

TECHNICAL FIELD

The present invention generally relates to apparatus for injection molded air intake tracts that further integrate engine crankcase PCV venting together with cyclonic oil mist separation.

BACKGROUND OF THE INVENTION

Internal combustion engines are known to produce blow-by gases during operation. Blow-by gas is produced when some portion of the fuel/air mixture that burns in the combustion chamber is forced past the piston rings during the compression stroke or in the following power stroke. Blow-by gas flow increases with engine wear, usually due to piston rings losing some of their sealing ability with age/wear. This blow-by gas may become saturated with engine oil as it proceeds into the crankcase area of the engine. Engine blow-by is always accompanied by increased pressure in the engine crankcase, which, if not addressed, can cause engine and crankcase seals to leak.

One old and environmentally undesirable solution is to vent engine blow-by gases to the atmosphere such as through an oil fill and vent cap.

Another well known solution is to vent the blow-by gases back into the engine air intake system through a one-way crankcase pressure relief valve, also known as a PCV valve. Blow-by gases may be saturated with oil mist and vapors, so to avoid fouling deposits it is undesirable to directly reintroduce oil laden blow-by gases into the engine air intake system.

A variety of devices have been applied in attempts to remove oil from blow-by gases so as to keep oil out of the engine air intake duct. One such device is a filter having an oil coalescing filter media. This approach introduces other problems as the filter media eventually saturates with oil and becomes an obstruction to blow-by gas flow.

Another known device to remove oil from blow-by gas is a cyclonic oil mist separator. Cyclonic separators have advantages in that they have no moving parts and are resistant to oil fouling or oil plugging.

In conventional air/oil separating PCV systems, it is preferred and normal practice to tool the housing and components laterally (in-line with air flow through the intake duct). Although this approach is often preferred, it is not always feasible when system geometry is not conducive to the approach.

As can be seen, there is a need for an improved air/oil separating PCV apparatus that allows tooling of molded housing components in a vertical direction, particularly when its required shape and configuration is not conducive to lateral tooling.

SUMMARY OF THE INVENTION

In one aspect of the invention, an air/oil separating PCV apparatus for an engine has a housing having an upper portion and a lower portion with the portions extending in a substantially lateral direction and configured to closeably mate together to define an air intake tract therein. The housing includes and integrates one or more intake manifold connections, a cyclone mist separator assembly, oil reservoir and one-way reservoir drain valve or check valve. The cyclone mist separator assembly includes at least one separator cyclone each having a tangential air inlet in communication with and receiving engine blow-by gases and including a protruding scavenge oil outlet member having a drain aperture therethrough. The oil reservoir includes an oil reservoir cap having at least one cap seal interface member secured thereto. Each seal interface member has a receptacle aperture sized and configured to insertably receive a portion of an oil outlet member therein to deliver oil to the reservoir. Seal members are provided and received onto an outside surface of the oil outlet members and configured to seal between the oil outlet members and the receptacle apertures. The individual housing portions are advantageously configured and adapted to be tooled in a vertical direction substantially perpendicular to the lateral direction of extension of the housing portions.

In another aspect of the invention, the air/oil separating PCV apparatus further includes a normally closed bypass valve integrated into the housing and configured to open at a pre-determined increasing differential pressure to bypass gases around said separator cyclones. The valve is configured to open in the event blow-by gas flow exceeds separator cyclone capacity or in the event one or more of the separator cyclones is obstructed and therefore unable to operate as intended.

In another aspect of the invention, the air/oil separating PCV apparatus further includes a throttle body connection on the housing for connecting an engine throttle body providing air into the air intake tract and a turbo suction connection secured to the housing and in air flow communication with the air outlets of the separator cyclones.

In another aspect of the invention, the seal member comprises an elastomeric O-ring.

In another aspect of the invention, a portion of the air intake tract has a U-shape and an oil demisting and collection module is integrated into the upper and the lower housing modules positioned at an inner portion of the U-shape.

In another aspect of the invention, the air/oil separating PCV apparatus further includes a crankcase oil fill port and oil fill cap positioned directly above one of the air intake manifold connections. A portion of the oil demisting collection module extends over the one of the intake manifold connections and is provided with a closed bottom configured and adapted to closeably isolate the oil fill port from the one of the intake manifold connections.

In another aspect of the invention, the air/oil separating PCV apparatus further includes a third housing portion including the oil fill port and a turbo suction connection thereon, the third housing portion closeably received onto the second housing portion.

In another aspect of the invention, the housing includes two engine intake manifold connections and the air intake tract further includes a cross-over duct communicating intake air and bridging between the two engine intake manifold connections.

In another aspect of the invention the housing portions are tooled for and formed by injection molding of plastic materials.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof may be best understood with reference to the following description, taken in conjunction with the accompanying drawings. The drawings show a form of the invention that is presently preferred; however, the invention is not limited to the precise arrangement shown in the drawings.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

DESCRIPTION OF THE PREFERRED EMBODIMENTS

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

An improved air/oil separating PCV apparatus is provided by the present invention that provides integration of an air duct, cross-over duct, cyclonic oil mist separator assembly, bypass valve, oil reservoir, one way oil drain valve and oil fill port and cap into a single injection molded apparatus. The improved air/oil separating PCV apparatus is configured and arranged to permit it to be tooled in a vertical direction for injection molding.

Figure 1:
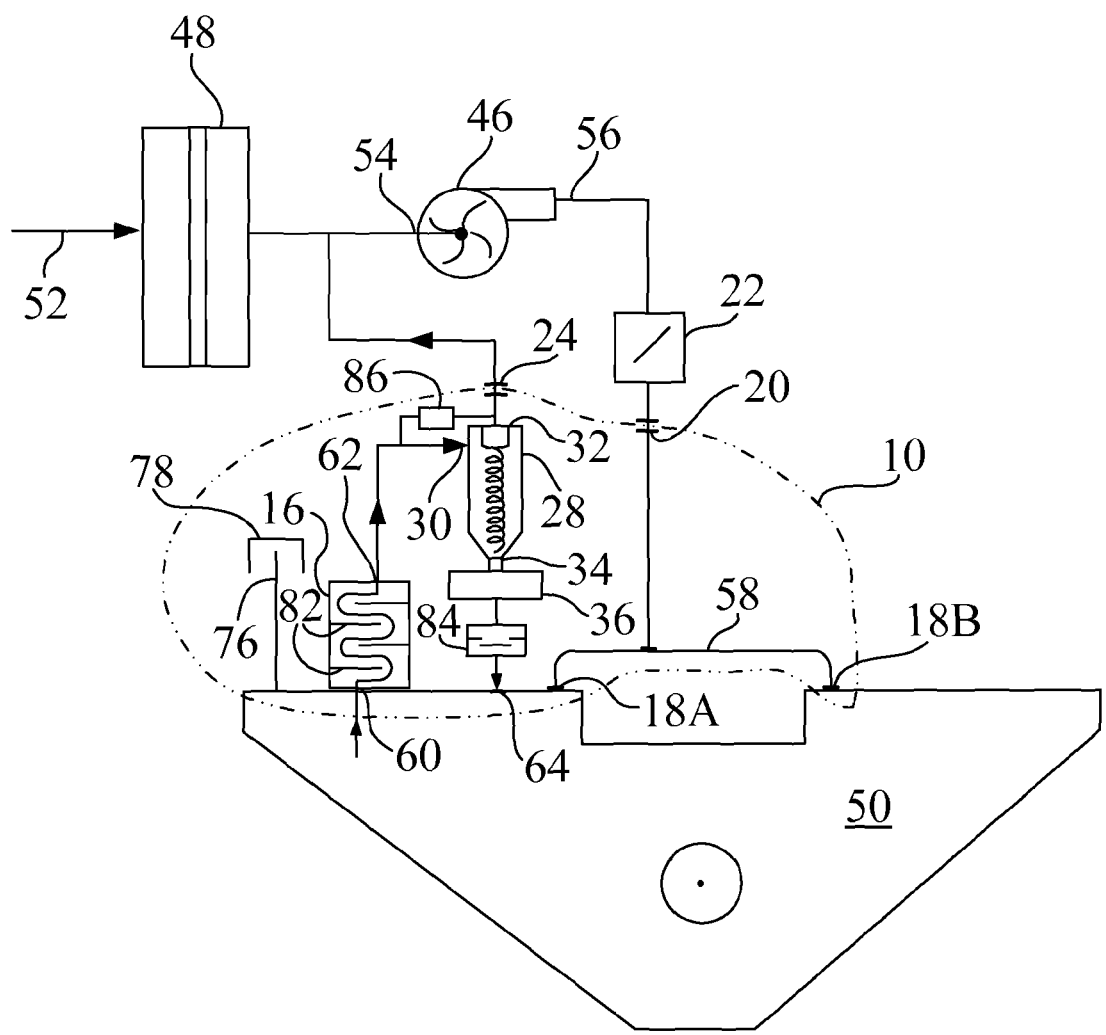
FIG. 1 is a schematic representation of one variation of an air/oil separating PCV apparatus applied to an internal combustion engine consistent with the present invention.

FIG. 1 is a schematic representation of one variation of an air/oil separating PCV apparatus 10 applied to an internal combustion engine 50 consistent with the present invention. The area enclosed by dashed line 10 generally represents components integrated into the air/oil separating PCV apparatus 10, consistent with the present invention.

In FIG. 1, a turbocharger 46 draws outside air 52 through an air filter 48 and develops a pressure differential dP (dP=outlet pressure−inlet pressure) between the outlet 56 and inlet 54. Air from the turbocharger 46 is delivered to the throttle body 22, then exits the throttle body 22 to enter the throttle body connection 20 of the air/oil separating PCV apparatus 10. In the illustrated variation, the air is then delivered through the air intake tract 58 to the left and right cylinder banks of engine 50 through intake manifold connections 18A and 18B of the air/oil separating PCV apparatus 10, thereby providing combustion air for engine operation.

Oil laden or blow-by gas flows from the crankcase of engine 50 into the inlet 60 of chamber 16 of the air/oil separating PCV apparatus 10. Chamber 16, in some embodiments, may include one or more baffles 82 positioned generally cross-wise to blow-by gas flow entering the chamber to form a twisting path labyrinth that provides some initial oil separation. By contact with the baffles 82, oil droplet mist in the blow-by gas may be partially removed by coalescing small droplets into large droplets on the baffles 82. Oil droplets are then return back into the engine 50 by gravity. In other embodiments, the air/oil separating PCV apparatus 10 does not include baffles 82 in the labyrinth chamber 16.

The outlet 62 of the chamber 16 is connected within the apparatus 10 to the tangential air inlet(s) 30 of the separator cyclone(s) 28, which are also integrated into the air/oil separating PCV apparatus 10. Separator cyclone(s) 28 are cyclonic oil mist separator cyclones configured to swirl inlet gases to remove entrained oil by centrifugal force. Oil droplets exit the scavenge oil outlet member 34 of the separator cyclone(s) 28 to enter the oil reservoir 36. Oil reservoir 36 is also integrated into the housing of the air/oil separating PCV apparatus 10 of the present invention. Oil from the reservoir 36 drains through one-way check valve 84 then continues through the oil reservoir outlet connection 64 of air/oil separating PCV apparatus 10 to be returned to the engine crankcase sump. One-way check valve 84 permits oil to drain from the reservoir 36 into the engine 50, but prevents blow-by gas from entering the reservoir 36 from the engine 50 through oil reservoir outlet connection 64 of the air/oil separating PCV apparatus 10, thereby preventing blow-by gas from entering the oil outlet member(s) 34 of separator cyclone(s) 28. During operation, the oil reservoir 36 may or may not contain an inventory of oil. The reservoir 36 provides oil storage capacity incase the check valve (or one way oil drain valve) 84 and outlet 64 are unable to handle a surge in oil flow from the separator cyclone(s) 28. In this event, surge oil flow is temporarily stored in the reservoir 36 until it eventually drains back into the engine 50, permitting uninterrupted operation of the separator cyclone(s) 28.

Air, now substantially free of oil, leaves the separator cyclones 28 through air outlet connection 32 of the air/oil separating PCV apparatus 10 and is delivered (in the illustrated exemplary embodiment) to the suction side 54 of the turbocharger 46. The differential pressure dP developed across the turbocharger 46 provides the motive force to drive the cyclonic oil separation of the separator cyclone(s) 28. Blow-by gases from the engine 50 are thereby cleansed of entrained oil before delivery back into the engine air intake.

A spring loaded bypass valve 86 is provided and located proximate to the separator cyclone(s) 28. The spring loaded bypass valve 86 is normally closed but configured to open when the differential pressure across the bypass valve 86 exceeds a pre-determined value, indicative that the separator cyclone(s) 28 are operating above maximum flow capacity. In this case, bypass valve 86 opens to permit blow-by gas to bypass the separator cyclone(s) 28. This may rarely occur if the engine is operated under very extreme conditions or if the separator cyclone(s) are not functioning properly.

Figure 2:
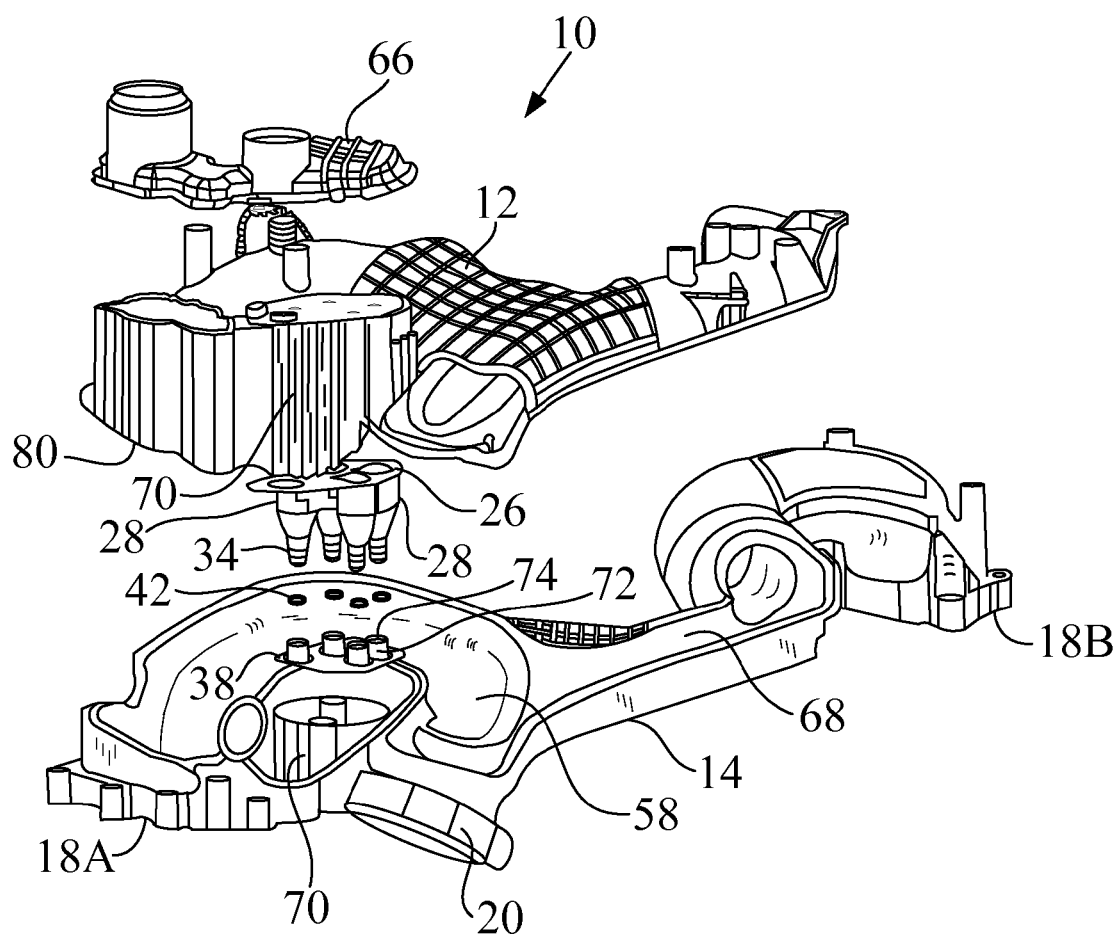
FIG. 2 is an exploded perspective view of one particular embodiment of an air/oil separating PCV apparatus consistent with the present invention.
Figure 3:
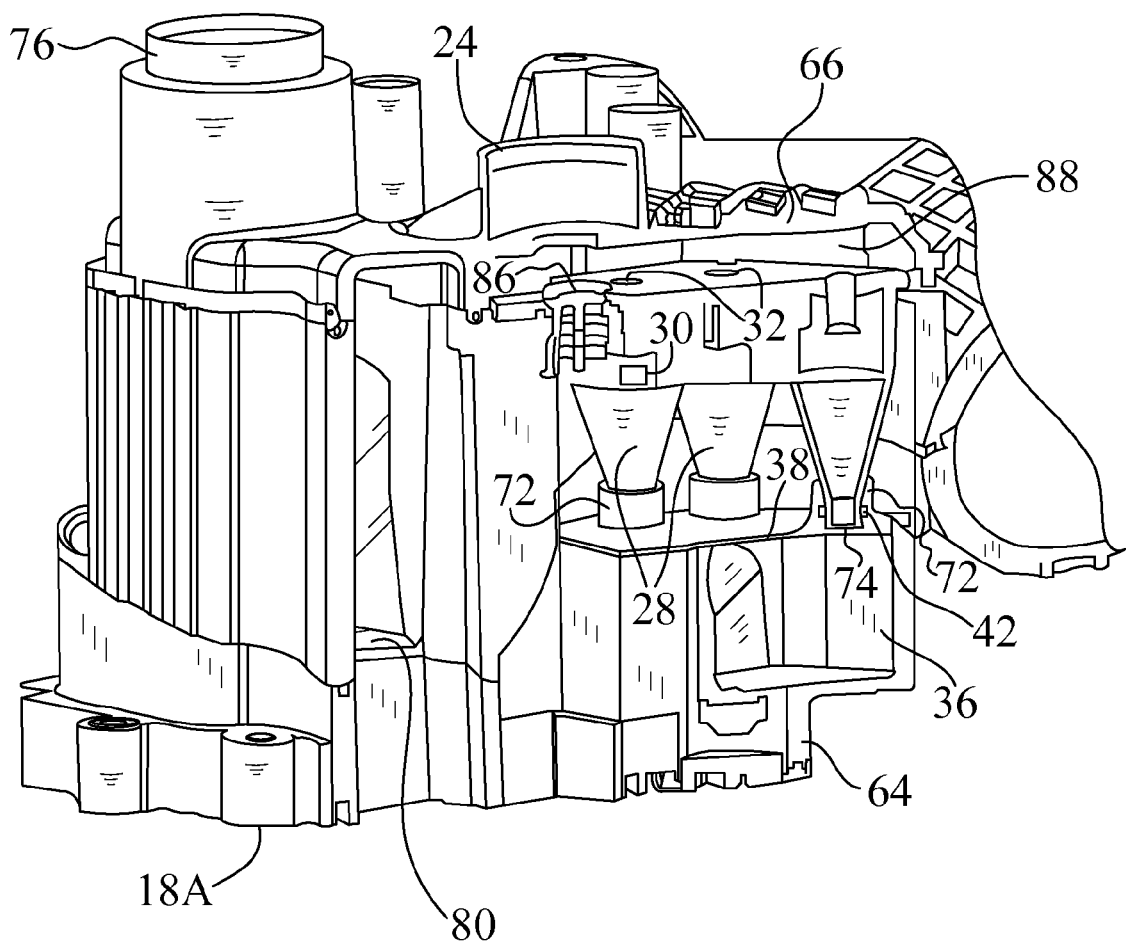
FIG. 3 is a partial cut-away view of the assembled air/oil separating PCV apparatus illustrated in FIG. 2.

The discussion is now directed to FIGS. 2 and 3, to be viewed together with FIG. 1. FIG. 2 is an exploded perspective view of one particular embodiment of an air/oil separating PCV apparatus 10 consistent with the present invention. FIG. 3 is a partial cut-away view of the assembled air/oil separating PCV apparatus 10 illustrated in FIG. 2. An upper housing portion 12 and a lower housing portion 14 extend substantially in a lateral direction and are configured to closeably mate so as to define an air intake tract 58 within. In the illustrated embodiment, the housing further includes a mating third housing member 66 so that the housing in FIG. 2 includes 12, 14 and 66. The lower housing portion 14 has formed thereon a first intake manifold connection 18A configured to deliver combustion air to a cylinder bank and an engine 50, and similarly a second intake manifold connection 18B configured to deliver combustion air to another cylinder bank and an engine 50. A throttle body connection 20 is provided on the lower housing portion 14 for introduction of combustion air from a throttle body 22 into the intake tract 58 delivering combustion air through intake manifold connection 18A and further including cross-over duct 68 delivering air to the cylinder bank on the opposing side of the engine through intake manifold connection 18B. The air intake tract 58 of the upper 12 and lower 14 housing portions in the vicinity of the first intake manifold connection 18A, in at least the exemplary embodiment illustrated, is generally U-shaped. In the inner portion of the U-shape an oil demisting and collection module 70 is formed and integrated into the air/oil separating PCV apparatus 10.

The oil demisting and collection module 70 includes a cyclone mist separator assembly 26 having a plurality of separator cyclones 28 arranged to process oil laden air in a parallel fashion. Each separator cyclone includes an oil outlet member 34 having an aperture therethrough configured to deliver scavenged oil from the separator cyclones 28 to oil reservoir 36. A bypass valve 86 is provided to permit oil laden air to bypass the separator cyclones 28 in the rare event the flow of oil laden air exceeds separator cyclone capacity or in the event of a malfunction of the separator cyclones. An oil reservoir cap 38 is received into the lower housing portion 14 and is configured and adapted to close over a top portion of the oil reservoir 36, thereby providing a closed reservoir chamber. The oil reservoir cap 38 has a plurality of seal interface members 72 secured thereto with each seal interface member 72 having a receptacle aperture 74 sized and configured to insertably receive the lower portion of the separator cyclone oil outlet members 34 therein. Onto the outside surface of each oil outlet member 34 a seal member such as O-ring 42 is received. The O-ring 42 is configured and adapted to provide a tightly sealed connection between the separator cyclones 28 and the oil reservoir cap 38. Each separator cyclone 28 includes an air outlet 32 configured to deliver demisted air into a chamber 88 under the third housing member 66 which is then communicated to turbocharger 46 through the turbo connection 24 provided in the third housing member 66. Scavenged oil from the oil reservoir 36 is returned into the engine interior through oil reservoir outlet 64.

An oil fill port 76 is provided on the third housing portion 66 and configured to be closeably covered by an oil fill cap 78 (see FIG. 1) for filling oil into the crankcase of the engine 50. The oil demisting and collection module 70 in the upper housing portion 12 has a portion with a closed bottom 80 that extends over the first intake manifold connection 18A. The closed bottom separates and isolates the oil fill port 76 from the first air intake manifold 18A and is sloped to direct oil filled through the oil fill port 76 away from the air intake and instead into the crankcase of engine 50. The closed bottom prevents oil laden vapors from the engine crankcase from reaching the air intake manifold 18A. The U-shaped air intake tract and the positioning of the oil demisting collection module over the oil fill entry into the engine advantageously results in a smaller size air/oil separating PCV apparatus, thereby reducing space requirements on the engine and reducing the amount of material to mold the apparatus.

As can be appreciated, in the present invention the housing portions 12, 14 and 66 are configured and adapted to be tooled in a vertical direction substantially aligned with the axis of symmetry of the separator cyclones 28 and substantially perpendicular to the lateral direction in which the housing portions 12 and 14 extend.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:
1. An air/oil separating PCV apparatus for an engine, comprising:
   a housing having an upper portion and a lower portion, said portions extending in a substantially lateral direction and configured to closeably mate to define an air intake tract therein, said housing including:
      at least one intake manifold connection provided on said housing and configured for connecting to an engine air intake manifold for air flow communication with said air intake tract; and
      a cyclone mist separator assembly received into said housing, said assembly having at least one separator cyclone to separate oil from engine blow-by gases, each cyclone having an axis of symmetry, said cyclones having:
         a tangential air inlet in communication with blow-by gases from an interior of said engine;
         an air outlet; and
         a protruding scavenge oil outlet member having a drain aperture therethrough;
      an oil reservoir defined in said mating housing portions and configured to receive oil from said separator cyclones;
      a one way oil drain valve interposed between an oil drain of said reservoir and an oil reservoir outlet connection on said housing leading to said engine interior, said drain valve preventing reverse flow of gases from said engine into said reservoir;
      a oil reservoir cap received into said housing and sized and configured to cover a top portion of said oil reservoir, said cap having at least one cap seal interface member, each seal interface member having a receptacle aperture sized and configured to insertably receive a portion of said oil outlet member therein, wherein said oil outlet members are in communication with an interior of said oil reservoir to deliver oil to said reservoir; and
      at least one seal member, each seal member received onto an outside surface of said oil outlet members and configured to seal between said oil outlet members and said receptacle apertures;

wherein said housing portions are configured and adapted to be tooled in a vertical direction substantially perpendicular to said lateral direction of extension of said housing portions.

2. The air/oil separating PCV apparatus of claim 1, further comprising a normally closed bypass valve configured to open at a pre-determined increasing differential pressure to bypass gases around said separator cyclones.

3. The air/oil separating PCV apparatus of claim 2, further comprising a labyrinth chamber connected and configured to provide initial oil separation from engine blow-by gases before they enter said separator cyclone tangential air inlets, said labyrinth chamber having at least one baffle forming a twisting path for coalescing removal of oil droplets from said blow-by gases.

4. The air/oil separating PCV apparatus of claim 3, further comprising:
- a throttle body connection on said housing for connecting an engine throttle body providing air into said air intake tract; and
- a turbo suction connection secured to said housing and in air flow communication with said air outlets of said separator cyclones.

5. The air/oil separating PCV apparatus of claim 4, wherein said seal member comprises an elastomeric O-ring.

6. The air/oil separating PCV apparatus of claim 5, wherein a portion of said air intake tract has a U-shape; and
an oil demisting and collection module is integrated into said upper and said lower housing modules positioned at an inner portion of said U-shape.

7. The air/oil separating PCV apparatus of claim 6, further comprising:
- a crankcase oil fill port and oil fill cap positioned directly above one of said air intake manifold connections;
- wherein a portion of said oil demisting collection module extends over said one of said intake manifold connections and is provided with a closed bottom configured and adapted to closeably isolate said oil fill port from said one of said intake manifold connections.

8. The air/oil separating PCV apparatus of claim 7, further comprising:
- a third housing portion including said oil fill port and a turbo suction connection thereon, said third housing portion closeably received onto said second housing portion.

9. The air/oil separating PCV apparatus of claim 8, wherein said at least one intake manifold connection is two engine intake manifold connections; and
wherein said air intake tract further includes a cross-over duct communicating intake air and bridging between said two engine intake manifold connections.

10. The air/oil separating PCV apparatus of claim 9, wherein said housing portions are tooled for and formed by injection molding of plastic materials.

* * * * *